United States Patent [19]

Proudley et al.

[11] Patent Number: 4,837,038

[45] Date of Patent: Jun. 6, 1989

[54] DECAFFEINATION PROCESS

[75] Inventors: John C. Proudley, Delaware; William S. Symbolik, Marysville, both of Ohio

[73] Assignee: Nestec SA, Vevey, Switzerland

[21] Appl. No.: 151,507

[22] Filed: Feb. 2, 1988

[51] Int. Cl.$^4$ ............................................. A23F 5/20
[52] U.S. Cl. .................................................. 426/428
[58] Field of Search ......................................... 426/428

[56] References Cited

U.S. PATENT DOCUMENTS

| | | | |
|---|---|---|---|
| 3,671,262 | 6/1972 | Wolfson et al. | 426/428 |
| 3,671,263 | 6/1972 | Patel et al. | 426/428 |
| 4,088,794 | 5/1978 | Katz et al. | 426/432 X |
| 4,276,315 | 6/1981 | Katz et al. | 426/428 |
| 4,364,964 | 12/1982 | van der Stegen | 426/427 X |
| 4,465,699 | 8/1984 | Pagliaro et al. | |
| 4,474,821 | 10/1984 | Morrison, Jr. et al. | |

FOREIGN PATENT DOCUMENTS

| | | |
|---|---|---|
| 0114426 | 1/1984 | European Pat. Off. |
| 1532547 | 11/1978 | United Kingdom |

*Primary Examiner*—Joseph Golian
*Attorney, Agent, or Firm*—Vogt & O'Donnell

[57] ABSTRACT

Caffeine-containing vegetable materials are decaffeinated by contacting the vegetable materials with a substantially laminar flow of a fatty material having a superficial velocity of at least about $10 \times 10^{-3}$ m/sec. Recycling of the fatty material may be also carried out in one or more extraction vessels.

10 Claims, No Drawings

DECAFFEINATION PROCESS

BACKGROUND OF THE INVENTION

The present invention relates to decaffeination of caffeine-containing vegetable materials, such as coffee, particularly green coffee beans.

Various means and methods for effecting extraction of caffeine from vegetable materials, particularly from green coffee beans, have been proposed. Efforts have been directed to reducing the amount of time to effect decaffeination for providing more efficient commercial manufacturing operations and reduction of costs and for enhancing the quality of the decaffeinated product.

The teachings of European Patent Publication No. 0 114 426 and U.S. Pat. No. 4,474,821 are directed to increasing the rate of decaffeination of green coffee beans by inducing a turbulent flow of an extraction medium comprising non-chlorinated esters, preferably ethyl acetate. These references postulate that caffeine removal may be modelled as a first order mass transfer process and teach that the induced turbulent flow is essential for accelerating and optimizing the decaffeination rate. These references teach that different conditions are required when utilizing single-vessel versus multi-vessel systems, particularly in regard of control of water content of the beans and that recycling of the extraction medium is required for uniformity of decaffeination in the extraction vessels. It also is disclosed that the process increases the acidity of the decaffeinated coffee as compared with coffee which is decaffeinated with the same solvent but not in accordance with the disclosed invention.

The extraction medium flow which these references indicate must be induced is characterized by a Reynolds number greater than 250 and preferably above 500. These references calculate the Reynolds number by means of the formula:

$$R_E = D_P G / \mu$$

wherein $D_P$ is the particle diameter when a spherical diameter is assumed for the bean, G is an extraction medium mass superficial velocity based on an empty cross sectional area of an extraction column and $\mu$ is the extraction medium viscosity. As disclosed in these references, by reason of these relationships and this equation, for $R_E$ values less than 10 the flow is characterized as being laminar, between 10 and 100 the flow is characterized as being in a transition zone, and above 100 the flow is characterized as becoming turbulent.

Decaffeination of vegetable materials, including coffee, utilizing a fatty material is also known, as disclosed in U.S. Pat. No. 4,465,699 and British patent specification No. 1,532,547. The variables and conditions heretofore recognized as affecting and influencing efficiency of the decaffeination process with a fatty material were the weight ratio of the fatty material to the vegetable material, the temperature of contact and the overall time of contact, and the extent of regeneration of the fatty material, i.e., removal of extracted caffeine from the fatty material after extraction to permit re-use of the fatty material in the process.

SUMMARY OF THE INVENTION

The present invention provides a process by which the rate of decaffeination of a caffeine-containing vegetable material by means of a fatty material is optimized by contacting the vegetable material with a substantially laminar flow of fatty material. Optimizing the decaffeination process in accordance with the present invention enhances the previously appreciated result-effective variables taught by the afore-mentioned '699 patent and British Specification, and it has been found that operating in accordance with the present invention results in less thermal degradation and better preservation of the green quality of the beans and hence provides improved decaffeinated beans. The benefits of the process may be realized with or without recycling, and the process does not require different conditions when utilizing a single versus a multi-vessel system, although for practical commercial purposes, multi-vessel systems are utilized to the exclusion of single vessel systems.

The process of the present invention is characterized in that a first embodiment is effected by contacting caffeine-containing vegetable material, such as green coffee beans, in at least one vessel with a substantially laminar flow of fatty material having a superficial velocity of from at least about $10 \times 10^{-3}$ m/sec, preferably from about $10 \times 10^{-3}$ m/sec to about $40 \times 10^{-3}$ m/sec and most preferably from about $20 \times 10^{-3}$ m/sec to about $35 \times 10^{-3}$ m/sec.

A superficial velocity, as is well-known in the art, is an "empty pipe flow" velocity, that is, the volumetric flow of a material with respect to time ($m^3/s$) through an empty vessel divided by the cross-sectional area of the vessel ($m^2$). With the fatty materials utilized for extraction in the present invention, the superficial velocity flow rates of the present invention of from about $10 \times 10^{-3}$ m/sec to about $40 \times 10^{-3}$ m/sec correspond with Reynolds numbers, calculated in accordance with the formula $R_E = D_P G / \mu$, on the order of from about 3 to about 20, respectively. In the context of the present invention, the term "substantially laminar" flow is intended to include, in accordance with the foregoing formula for determining Reynolds numbers, flow rates which are defined as being in the "transition" zone but which do not exhibit the characteristics of turbulent flows as are known to the artisan.

Via trials performed, it has been discovered that at superficial velocities below about $10 \times 10^{-3}$ m/sec, the rate of decaffeination and the extent of decaffeination for a given time are significantly less than that which can be achieved at and above this velocity. That is, it appears from experiments performed that the rate and extent of decaffeination for a given time steadily increases at superficial velocities below and up to superficial velocities of up to about $10 \times 10^{-3}$ m/sec, which was not heretofore appreciated. Above the flow rate of about $10 \times 10^{-3}$ m/sec an increase in the rate of decaffeination continues to be realized but the rate of increase is appreciably less than that which is noticed below $10 \times 10^{-3}$ m/sec which was also not heretofore appreciated. That is, as the flow rate of the fatty material increases above $10 \times 10^{-3}$ m/sec, the rate of decaffeination increases gradually, and it surprisingly has been found that it appears to stabilize and be optimized at a flow rate of from about $20 \times 10^{-}$ m/sec to about $35 \times 10^{-}$ m/sec to about $40 \times 10^{-}$ m/sec even though these flow rates are characterized as being essentially laminar, which would not be expected based upon conventional views of the behavior of fluids having substantially laminar flow rates.

Thus, if plotted on a graph, for flow rates below $10 \times 10^{-3}$ m/sec, a curve having a steep slope is noted;

at a flow rate of about $10 \times 10^{-3}$ m/sec, the curve perceptibly changes slope and the curve then begins to level off and approach a zero slope at an ever-increasing rate up to flow rates approaching $40 \times 10^{-}$m/sec and beyond. Although superficial velocities higher than $40 \times 10^{-3}$ m/sec ($R_E > 20$) would appear theoretically to enhance the rate of decaffeination somewhat more, it appears that at about flow rates of $40 \times 10^{-3}$ m/sec, and above, the phenomenon of diffusion of caffeine from the interior of the beans for transfer of caffeine to the fatty material from the surface of the beans becomes the controlling variable resulting in diminishing returns for effecting any increased superficial velocity.

Additionally, it has been found that at flow rates in accordance with the present invention as compared with lower flow rates, for a given rate of production and for a given final decaffeination level, the draw-off ratio is increased less than would be expected from increasing the flow rate, as it appears that the draw-off ratio is not linearly related to the flow rate of the fatty material. For purposes of this application, the draw-off ratio is defined as the ratio by weight of fatty material utilized for decaffeination to the weight of caffeine-containing material to be decaffeinated. By reason of the process of the present invention, the draw-off ratio is preferred to be less than 50:1 and generally is on the order of 10:1 to 50:1, but most preferably, draw-off ratios below 10:1 are sought.

Therefore, at the aforestated superficial velocities, present efforts indicate that the concentration gradient of caffeine from the beans to the decaffeinating fatty material is optimized and reaches a peak efficiency. That is, a higher level of caffeine is taken up and dissolved in the fatty material, as compared with fatty material superficial velocity flow rates lower than the ranges set forth above. Thus, decaffeinating coffee beans with fatty material in accordance with the present invention increases the rate of decaffeination and enables a decrease of residence time for achieving a desired extent of decaffeination and hence optimal utilization of the fatty material because the concentration of extracted caffeine in the fatty material is increased to enable lower draw-off ratios than would be expected.

The present invention is further characterized in that additional embodiments are effected by recovering fatty material discharged from at least one vessel after it has contacted the vegetable material, i.e., green coffee beans, and recycling a portion of the recovered fatty material for contacting the beans in the vessel from which the portion was recovered with a substantially laminar flow of that portion and fresh fatty material having a superficial velocity of at least about $10 \times 10^{-3}$ m/sec, preferably from about $10 \times 10^{-3}$ m/sec to about $40 \times 10^{-3}$ m/sec and most preferably from about $20 \times 10^{-3}$ m/sec to about $40 \times 10^{-3}$ m/sec. "Fresh" fatty material is herein intended to mean and be inclusive of fatty material which is fed into the system, and when utilizing a plurality of vessels connected In series, "fresh" fatty material is that portion not recycled to a vessel from whence it was discharged and which thus is fed to the next vessel in series.

The recycling embodiments may be practiced when the velocities of fresh fatty material fed to a system and passed on through a multi-vessel system from vessel to vessel are less than the aforestated rates for effecting contact of the fatty material with the beans, or when the fresh fatty material fed to a system and passed from vessel to vessel has superficial velocities at the aforestated rates for complementing and further enhancing the efficiency of the system. By reason of recycling, the residence time and/or the draw-off ratio may be further reduced as compared with comparable systems and conditions with no recycling. In embodiments utilizing a plurality of vessels, if less than all vessels are recycled, that is, when at least one vessel is utilized for recycling fatty material, the most fresh vessel or vessels, that is, the vessels in series containing vegetable material having the highest caffeine content, are the vessels most preferred for recycling.

These and other features and advantages of the invention are further described with reference to the following illustrative description and Examples.

DETAILED DESCRIPTION OF THE INVENTION

In practicing the present invention, preferably, a plurality of extraction vessels are utilized in series and the decaffeinating fatty material is contacted with the vegetable material in a counter-current fashion, as is well-known by those skilled in the art. At steady state, a system is achieved wherein each of the vessels contains material having a caffeine content differing from that contained in the other vessels, the object being to achieve decaffeination on the order of 97%, that is, 97% or more of the caffeine originally present is removed from the vegetable material. Thus, the most fresh vessel, as defined above, contains material to be first processed and therefore contains material having the highest level of caffeine. A fresh vessel is placed first in series when the last vessel of the series, the vessel containing material which has been processed the most, thus having the least amount of caffeine, is removed from the series. Vessels there-between will contain material having intermediate amounts of caffeine with regard to the amount of caffeine contained in the material within the first fresh vessel and with regard to that remaining in the material in the last vessel. As fatty material is passed through the system counter-currently, each vessel obtains fresh fatty material, the first fresh vessel receiving fresh fatty material from a source of a fatty material, the second receiving fresh material from the first and so forth.

For purposes of this specification, the disclosures and teachings of U.S. Pat. No. 4,465,699 and British patent specification No. 1,532,547 are incorporated by reference, as if fully set forth herein.

As taught in the '699 patent, fatty materials useful in the present invention are water-immiscible and include animal and vegetable fats and oils and admixtures or fractions thereof. Such fatty materials are customarily composed of esters of fatty acids, usually glycerol esters, and may be utilized in either their native form or in forms resultant from conventional treatments, which are known in the art. The fatty materials may be in either unsaturated or saturated form. Similarly, unrefined or conventionally refined oils as well as oils with or without such additives as antioxidants and preservatives are all useful. It is preferred, however, that the fatty materials contain few, if any, surfactants, either natural or artificial, because surfactants tend to promote formation of emulsions upon agitation and because the stability of surfactants tends to interfere with facile separation of fatty material and water phases.

The fatty materials of the present invention are inclusive of commercial oils, fats, etc., and thus myriad operative possibilities are readily available to those skilled in the art. Of the potential fatty materials, those which are food acceptable are highly preferred for processing comestibles, and illustrative of such fatty materials are safflower oil, soy bean oil, corn oil, peanut oil, coffee oil, triolein, olive oil, and lard. When decaffeinating coffee beans, coffee oil is most preferred.

When the vegetable material to be decaffeinated is coffee, roast coffee beans and green beans may be utilized, with green beans being preferred. When roast coffee beans are utilized, volatiles are desirably removed first to avoid undue loss of these constituents.

The beans are, most desirably, provide in whole, natural, form. When utilizing a ground or crushed form, care is required to achieve uniformity of bed packing of the extraction vessels to ensure uniformity of results and consistent operation.

In steps preparatory for practice of the present invention with coffee beans, the beans are wetted to a moisture content of from 20% to 60%, based upon the dry weight of the beans, preferably to a moisture content of from 40% to 60%. A small quantity of water should be provided with the fatty material, on the order of up to about 1% by weight of the fatty material.

Additionally, as further disclosed and taught by the '699 patent, to avoid degradation of the fatty material during the decaffeination process, temperatures above 150° C. should be avoided during caffeine extraction, and temperatures on the order of 50° C. to 120° C. are preferably utilized.

In accordance with the present invention, the beans are contacted with a substantially laminar flow of the fatty material, wherein the fatty material has a superficial velocity of at least about $10 \times 10^{-3}$ m/sec and preferably, from about $10 \times 10^{-3}$ m/sec to about $40 \times 10^{-3}$ m/sec. Superficial velocities on the order of from about $20 \times 10^{-3}$ m/sec to about $35 \times 10^{-3}$ m/sec appear to be most efficient and are thus most preferred.

Recycling may be effected by splitting the flow discharged from a vessel into two paths whereby one path of one portion of the fatty material, preferably most of the amount discharged for greatest efficiency, is recycled back into the vessel from whence it was discharged for attaining the aforestated superficial velocities and for realizing greater reductions of the draw-off ratio.

The contacting of the fatty material with the caffeine-containing material may be effected at the required velocities in the vessels by pumps and controls in lines feeding the vessels. The recycling apparatus can be prepared readily by one of ordinary skill by fitting appropriate piping to inlets and outlets of the vessels with utilization of controls for splitting and combining flows of fresh and recycled material and utilization of pumps and controls for effecting and modulating flow to obtain the desired rates. When recycling, optionally, the fatty material discharged from a vessel is passed through a heater before reintroduction to the vessel from which it was discharged.

When recycling, the amount of fatty material recycled versus fresh material which is passed on to a next vessel in series or discharged from the system is an amount necessary, together with fresh fatty material which is fed into the system to a first vessel or which is received from a prior vessel, for effecting the desired superficial velocities. The amount of fatty material recycled may be an amount, for example, on the order of up to 80% to 90% of the fatty material passed through and discharged from a vessel; therefore, at least about 10% to 20% of the fatty material passed through and discharged from the vessel is passed on to a next vessel in series as fresh fatty material or is discharged from the system from a last vessel of the system.

Thus, to replace fatty material which is passed on, fresh fatty material is added to fatty material being recycled into the vessel in an amount substantially equivalent with the amount of fatty material which is passed on. The process, therefore, has a "recycle ratio" which is the difference between the weight of total fatty material discharged from a vessel minus the weight of fresh fatty material entering that vessel divided by the weight of the fresh fatty material entering the vessel replacing that which is passed on. It has been found that recycle ratios, as defined above, of from about 0.45 to about 10 are desirable and that recycle ratios of from about 2 to 6 are most preferred.

Quite surprisingly, it has been found that when utilizing a plurality of vessels, such as three or more vessels, whether or not the fresh fatty material superficial velocity is greater or less than $10 \times 10^{-3}$ m/sec, recycling in one or more of the most fresh vessels only, at the aforestated velocities, provides results which appear to make unnecessary, for practical purposes and reasons of economy, recycling in all vessels. As indicated above, the most fresh vessels are those in series containing beans having the highest levels of caffeine content. In fact, it has been found to be quite practical and efficient to recycle in the most fresh vessel only.

Additionally, it has been found that recycling only in the last vessel, the vessel containing beans having the lowest caffeine content, for practical purposes, does not significantly provide greater rates of decaffeination or significant further process time reduction beyond that found when one or more other more fresh vessels are recycled or when no vessels are recycled. This, of course, as the artisan will appreciate, is dependent upon the extent of decaffeination in prior vessels. As is commonly practiced in the art, however, the last vessel contains material which is approaching 97% decaffeination and as is appreciated also by the artisan, the last 1% to 3% of caffeine remaining in the beans as decaffeination approaches 97% removal is the relatively most difficult portion to remove. It is believed that this is because the mass transfer at the surface of the beans of more extracted beans, particularly the beans in the last vessel, plays a quite lesser role than it does with respect to beans which are less extracted and have a higher caffeine content, the phenomenon of diffusion of caffeine within the beans to the surface of the beans for removal from the surface being believed to be the major factor in the rate of decaffeination of the more extracted beans.

Thus, if fresh fatty material is not fed to and through the system at the aforestated rates, the stated superficial velocities may be attained by recovering fatty material discharged from at least one vessel and recycling it. Process efficiency may be further enhanced by supplying both fresh fatty material to and through the system and recycling fatty material in extraction vessels at the aforestated velocities. This embodiment further provides an even better concentration gradient with respect to the caffeine-containing fatty material for extracting caffeine from the beans and improving the rate of decaffeination for achieving a desired extent of decaffeination. That is, processing time is further reduced. The embodiment of fresh fatty material having a superficial velocity of at least about $10 \times 10^{-3}$ m/sec is particularly advantageous when recycling is not performed in all extraction vessels. As above, when recycling is not performed in all vessels, it is most advantageous to recycle in the most fresh vessel or vessels.

After achieving decaffeination of a desired extent, separation of caffeine-laden fatty material from the decaffeinated beans may be effected conveniently by simple drainage or by centrifugation, for example. The caffeine-laden fatty material discharged and recovered from the decaffeination system may be regenerated, as taught by either the aforementioned '699 patent and British Specification, for continued use in the decaffeination process.

EXAMPLES

The following Examples are provided as being illustrative of the present invention. Parts are by weight unless otherwise indicated.

EXAMPLE I

In the following trials, 4 extraction vessels in series are utilized. Batches of green coffee beans having moisture contents of about 45% to 47% on a wet basis are utilized. Coffee oil having a moisture content of about 0.5% by weight is utilized for extraction. All extraction trials are performed at about 93° C. for 8 hours, and the draw-off ratio is maintained at about 25:1 for each trial. Two full cycles of the extraction process are run before sampling so that samples are obtained from a steady state system.

Fresh oil fed to the vessels in all trials has a superficial velocity of $3.1 \times 10^{-}$ m/sec. Recycling to obtain superficial velocities in excess of $10 \times 10^{-3}$ m/sec is performed in all vessels in all trials but for trial 1. The recycle ratios are adjusted to obtain the desired velocities.

For recycling, pipes and controls are associated with an outlet header of each vessel together with pumps to recycle a portion of the outlet oil back to a bottom inlet of the same vessel via a heater prior to entering the vessel, the other portion being passed on. The amount recycled versus that passed on is illustrated below by the recyle ratio. Recycle rates are varied by adjusting variable speed drives on the pumps. Flow rates are monitored with an electronic flowmeter. After extraction the beans are de-oiled by centrifuging, dried and the amount of decaffeination is determined.

| Trial | Recycle Ratio Recycle:Passed On | Super. Vel. In Vessels × $10^{-3}$ m/sec | % Decaf. |
|---|---|---|---|
| 1 | — | — | 95.3 |
| 2 | 2:1 | 9.3 | 96.2 |
| 3 | 6:1 | 21.7 | 96.9 |
| 4 | 10:1 | 34.2 | 96.9 |
| 5 | 10:1 | 34.2 | 97.1 |

The increase of the superficial velocity by recycling which resulted in an additional 1.8% to 2.3% caffeine removal corresponds to about a 14% reduction in residence time.

EXAMPLE II

Extraction trials are conducted utilizing 6 extraction vessels in series. Green coffee beans having a moisture content of approximately 45%–46% are extracted with coffee oil having a moisture content of approximately 0.8% to 1% by weight. The trials are performed at a temperature of about 93° C. Samples are taken only after the system has reached a steady state. No recycling is effected. After extraction, the beans are de-oiled by centrifuging and then the beans are dried.

| Trial | Ext'n Time (hr) | Draw Off Ratio | Super. Vel. In Vessels × $10^{-3}$ m/sec | % Decaf. |
|---|---|---|---|---|
| 6 | 9 | 36.6 | 6.1 | 96.6 |
| 7 | 7 | 57 | 12.2 | 97.7 |
| 8 | 6.5 | 53 | 12.2 | 97.4 |

As can be seen from these trials, doubling the superficial velocity and achieving a rate above $10 \times 10^{-3}$ m/sec resulted not only in a greater degree of extraction, but process time also was reduced significantly and a lesser draw-off ratio than would be expected (73) from the doubling of the flow rate also resulted. Thus, Examples I and II demonstrate that even relatively small differences of from 0.1% to 0.3% can have a significant effect upon residence time and efficiency.

EXAMPLE III

In the following trials, 6 extraction vessels, coffee beans and coffee oil are again utilized and all conditions are the same as in Example I except recycling is performed in all vessels together with differing superficial velocities of the fresh oil fed to and through the system. In this experiment the recycle ratio is 6 parts of outlet oil to one part of fresh oil. Prior to determining the results, two full cycles of the series are run to obtain a steady state prior to sampling. The extraction time is 7 hr for trial 9 and 5.3 hr for trial 10. After extraction, the beans are de-oiled and dried. The velocities in the tables of this Example and all following Examples are velocities in the extraction vessels.

| Trial | Draw Off Ratio | Fresh Super. Vel. × $10^{-3}$ m/sec | Super. Vel. In Vessels × $10^{-3}$ m/sec | % Decaf. |
|---|---|---|---|---|
| 9 | 28 | 6.1 | 22 | 97.7 |
| 10 | 43 | 12.2 | 22 | 97.3 |

As can be seen from the results of these trials together with the results of the trials of Example I, utilizing recycling at the stated superficial velocities enhances efficiency. Utilization of fresh material to the vessels at above $10 \times 10^{-3}$ m/sec in combination with recycling at the stated rates further enhances productivity. In trial 9, the recycle ratio is about 2.6, and in trial 10, the recyle ratio is about 0.8.

EXAMPLE IV In the following trials, 4 extraction vessels are utilized. Green coffee beans are utilized in the trials and have moisture contents between 45% and 47% with coffee oil again being the extraction media. In trial no recycling is utilized and in trials 12 and 13, all vessels are recycled. All other procedures and conditions are essentially the same as in Examples I–III. The extraction time is 8 hr for trial 11 and 6.6 hr for trials 12 and 13.

| Trial | Draw Off Ratio | Fresh Super. Vel. × $10^{-3}$ m/sec | Super Vel. In Vessels × $10^{-3}$ m/sec | % Decaf. |
|---|---|---|---|---|
| 11 | 48.7 | 6.1 | — | 96.9 |
| 12 | 40.6 | 6.1 | 22 | 97.5 |

-continued

| Trial | Draw Off Ratio | Fresh Super. Vel. × $10^{-3}$ m/sec | Super Vel. In Vessels × $10^{-3}$ m/sec | % Decaf. |
|---|---|---|---|---|
| 13 | 40.6 | 6.1 | 34 | 97.4 |

As can be seen from these results, recycling performed above $10 \times 10^{-3}$ m/sec yields a further reduction in process time and draw off ratio of about 17%. Recycle ratios are about 2.6 and about 4.6 for trials 12 and 13, respectively.

EXAMPLE V

In the following trials, 4 extraction vessels are utilized and the procedures and conditions are essentially the same as in Example III, except that only the "fresh" vessel employs recycling The extraction time for each trial is 6.6 hr.

| Trial No. | Draw Off Ratio | Fresh Super. Vel. × $10^{-3}$ m/sec | Super. Vel. In Vessels × $10^{-3}$ m/sec | % Decaf. |
|---|---|---|---|---|
| 14 | 40.6 | 6.1 | 22 | 96.7 |
| 15 | 40.6 | 6.1 | 34 | 97.1 |

As can be seen from these results, and those of trials 14 and 15 of Example III, recycling in the fresh vessel only is also very efficient. Recycle ratios are about 2.6 and about 4.6 for trials 14 and 15, respectively.

EXAMPLE VI

In the following trials, six vessels are utilized. The procedures and conditions are essentially the same as in Example II except that in trial 16 no recycling is utilized, in trial 17 all vessels are recycled, in trial 18 only the most fresh vessel is recycled and in trial 19 only the most and next most fresh vessels are recycled. The extraction time is 9 hr for trial 16 and 7 hr for the remaining trials.

| Trial No. | Draw Off Ratio | Fresh Super. Vel × × $10^{-3}$ m/sec | Super. Vel. In Vessels × × $10^{-3}$ m/sec | % Decaf. |
|---|---|---|---|---|
| 16 | 36.6 | 6.1 | — | 96.9 |
| 17 | 28.4 | 6.1 | 22 | 97.7 |
| 18 | 28.4 | 6.1 | 34 | 97.1 |
| 19 | 28.4 | 6.1 | 22 | 96.9 |

The foregoing results comport with those of Examples II and III. Advantageously, the embodiments having one or two extraction recycling vessels provide essentially the same decaffeination efficiency and draw-off ratio as does the embodiment with all vessels equipped for recycling even though flow rates differ.

From the foregoing, it will be clear to one of ordinary skill that various embodiments can be utilized to effect the objects of the present invention as described and illustrated without departing from the spirit and scope of the invention defined by the following claims.

We claim:

1. A process for decaffeinating green coffee beans in a system having at least one vessel for contacting green coffee beans with a fatty material comprising contacting green coffee beans in at least one vessel with a substantially laminar flow of a fatty material having a superficial velocity of at least about $10 \times 10^{-3}$ m/sec.

2. A process according to claim 1 further comprising recovering fatty material discharged from at least one vessel after it has contacted the beans and recycling a portion of the recovered fatty material for contacting the beans in the vessel from which the portion was recovered with a substantially laminar flow of the recycled portion and fresh fatty material having a superficial velocity of at least about $10 \times 10^{-3}$ m/sec.

3. A process for decaffeinating green coffee beans in a system having at least one vessel for contacting green coffee beans with a fatty material comprising recovering fatty material discharged from at least one vessel and recycling a portion of the recovered fatty material for contacting the beans in the vessel from which the portion was recovered with a substantially laminar flow of the recycled portion and fresh fatty material having a superficial velocity of at least $10 \times 10^{-3}$ m/sec.

4. A process according to claim 1 or 2 or 3 wherein the flow of fatty material has a superficial velocity of from about $10 \times 10^{-3}$ m/sec to about $40 \times 10^{-}$ m/sec.

5. A process according to claim 4 wherein the flow of fatty material has a superficial velocity of from about $20 \times 10^{-3}$ m/sec to about $35 \times 10^{-3}$ m/sec.

6. A process according to claim 1 or 2 or 3 having a draw-off ratio of fatty material to green beans by weight of less than 50:1.

7. A process according to claim 2 or 3 having a recycle ratio of from about 0.45 to about 10.

8. A process according to claim 7 wherein the recycle ratio is from about 2 to 6.

9. A process according to claim 1 or 2 or 3 wherein the fatty material is coffee oil.

10. A process according to claim 2 or 3 wherein there are a plurality of vessels in series and wherein the fatty material is recycled in at least one of the vessels in series containing the beans which have the highest levels of caffeine.

* * * * *

UNITED STATES PATENT AND TRADEMARK OFFICE
CERTIFICATE OF CORRECTION

PATENT NO. : 4,837,038
DATED : June 6, 1989
INVENTOR(S) : John C. Proudley, et al.

It is certified that error appears in the above-identified patent and that said Letters Patent is hereby corrected as shown below:

Column 10, line 35 [line 3 of claim 4], "40 x 10-m/sec." should read --$40 \times 10^{-3}$ m/sec.--.

Signed and Sealed this

Twentieth Day of February, 1990

*Attest:*

JEFFREY M. SAMUELS

*Attesting Officer*    *Acting Commissioner of Patents and Trademarks*